United States Patent [19]

Pavlath

[11] Patent Number: 5,020,912
[45] Date of Patent: Jun. 4, 1991

[54] FIBER OPTIC ROTATION SENSING SYSTEM AND METHOD FOR BASING A FEEDBACK SIGNAL OUTSIDE OF A LEGION OF INSTABILITY

[75] Inventor: George A. Pavlath, Thousand Oaks, Calif.

[73] Assignee: Litton Systems, Inc., Beverly Hills, Calif.

[21] Appl. No.: 305,621

[22] Filed: Feb. 3, 1989

[51] Int. Cl.$^5$ ............................................. G01B 9/02
[52] U.S. Cl. .................................................. 356/350
[58] Field of Search ......................................... 356/350

[56] References Cited

U.S. PATENT DOCUMENTS

| | | |
|---|---|---|
| 4,299,490 | 11/1981 | Cahill et al. . |
| 4,372,685 | 2/1983 | Ulrich . |
| 4,386,822 | 6/1983 | Bergh . |
| 4,493,528 | 1/1985 | Shaw et al. . |
| 4,585,347 | 4/1986 | Auch et al. . |
| 4,591,269 | 5/1986 | Mohr . |
| 4,707,136 | 11/1987 | Kim ..................................... 356/350 |
| 4,717,256 | 1/1988 | Ensley et al. . |
| 4,725,113 | 2/1988 | Chang et al. . |
| 4,729,620 | 3/1988 | Pavlath . |
| 4,729,622 | 3/1988 | Pavlath . |
| 4,735,506 | 4/1988 | Pavlath . |
| 4,738,511 | 4/1988 | Fling . |
| 4,753,507 | 6/1988 | DePaula et al. . |

FOREIGN PATENT DOCUMENTS

| | | |
|---|---|---|
| 2152207A | 11/1980 | United Kingdom . |
| 2100855A | 6/1981 | United Kingdom . |
| 2134248A | 1/1983 | United Kingdom . |
| 2178162A | 7/1985 | United Kingdom . |

OTHER PUBLICATIONS

"Principle of the Digital Phase Ramp", Lefevre et al., pp. 1-11, 1984.
Davis et al., Closed-Loop, Low-Noise Fiber-Optic Rotation Sensor, *Optic Letters*, vol. 6, No. 10, pp. 505-507.
LeFevre et al., Progress in Optical Fiber Gyroscopes Using Integrated Optics, pp. 1-12.
Pavlath et al., Fiber-Optic Gyroscopes: Advances and Future Developments, *Navigation: Journal of the Institute of Navigation*, vol. 32, No. 2, Sum. 1984, pp. 70-83.
Risk et al., Single-Sideband Frequency Shifting in Birefringent Optical Fiber, SPIE, vol. 478, *Fiber Optic and Laser Sensors II*, (1984), pp. 91-97.

Primary Examiner—Samuel Turner
Attorney, Agent, or Firm—Lynn & Lynn

[57] ABSTRACT

A closed loop fiber optic rotation sensing system prevents the occurrence of instabilities in its feedback signal by modulating the counterpropagating waves with a reference signal and demodulating an electrical signal indicative of the phase difference of two counterpropagating waves with the reference signal. The modulating means is driven to null the phase difference between the counterpropagating waves, and the feedback signal is adjusted to prevent instability. The counterpropagating waves may be either phase modulated or shifted in frequency. The means for modulating the counterpropagating waves may comprise a fiber optic frequency shifter connected to the fiber optic sensing coil and means for applying the reference signal to the frequency shifter. The feedback signal is adjusted with either a pseudo-random or a periodic signal having a zero mean value to prevent instability.

26 Claims, 5 Drawing Sheets

FIBER OPTIC ROTATION SENSING SYSTEM AND METHOD FOR BASING A FEEDBACK SIGNAL OUTSIDE OF A LEGION OF INSTABILITY

BACKGROUND OF THE INVENTION

This invention relates generally to rotation sensors and particularly to fiber optic rotation sensors. More particularly, this invention relates to an apparatus and method for processing the signals output from an optical rotation sensor. Still more particularly, this invention relates to an apparatus and method for reducing errors introduced in the output of a closed loop fiber optic rotation sensor caused by oscillations in the feedback signal in the servo loop.

A fiber optic ring interferometer typically comprises a loop of fiber optic material that guides counter-propagating light waves. After traversing the loop, the counter-propagating waves are combined so that they constructively or destructively interfere to form an optical output signal. The intensity of the optical output signal varies as a function of the interference, which is dependent upon the relative phase of the counter-propagating waves.

Fiber optic ring interferometers have proven to be particularly useful for rotating sensing. Rotation of the loop creates a relative phase difference between the counter-propagating waves in accordance with the well known Sagnac effect. The amount of phase difference is a function of the angular velocity of the loop. The optical output signal produced by the interference of the counter-propagating waves varies in intensity as a function of the rotation rate of the loop. Rotation sensing is accomplished by detecting the optical output signal and processing it to determine the rotation rate. In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper and lower limits to be measured is approximately $10^9$.

A closed loop rotation sensor feeds a signal indicative of the Sagnac phase shift to apparatus for adjusting the phase or frequency of the counterpropagating waves to null the rotation-induced phase difference between them. The amount that the waves must be adjusted in either frequency or phase to null the Sagnac phase shift indicates the rotation rate of the sensing loop.

Closed loop fiber optic rotation sensors utilizing phase modulators for servo loop closure are attractive due to the ready availability of components such as integrated optics phase modulators. Such phase modulators are effective for providing the desired amount of phase modulation for measuring rotation rates in the required dynamic range. Unfortunately imperfections in known phase modulators cause amplitude modulation and coherent Rayleigh scattering, which cause the servo loop to become unstable for certain rotation rates. In particular, the system becomes unstable for a zero rotation rate. Other rates at which instability occurs depend upon the modulation/demodulation techniques used in processing the output of the fiber optic rotation sensor. When the feedback signal in the servo loop is oscillating, no useful output from the fiber optic rotation sensor is available.

U.S. Pat. No. 4,299,490, issued Nov. 10, 1981 to Cahill et al. describes a phase nulling fiber optic rotation sensor using a frequency shifter in a feedback loop. The frequency shifter is placed at one end of the sensing coil so that both of the counterpropagating waves are shifted in frequency. The frequency shifting of the counterpropagating waves generates a non-reciprocal phase shift that is adjusted to offset any phase shift induced by rotation of the sensing coil. The signal required to null the rotation-induced phase shift is then processed to determine the rotation rate.

U.S. Pat. No. 4,372,685, issued Feb. 8, 1983 to Ulrich discloses a fiber optic rotation sensor that uses the Faraday effect to modulate the phase of counterpropagating waves in the sensing coil to null the rotation-induced phase shift.

U.S. Pat. No. 4,717,256 to Ensley et al. is directed to a fiber optic rotation sensor that includes a phase modulation of the counterpropagating waves in the sensing coil. An oscillator drives a phase modulator and also provides sinusoidal reference and timing signals to signal processing circuits to provide synchronous integration and extraction of the rate phase information from a modulated signal indicative of the interference pattern of the counterpropagating waves. The product of the modulated signal and the reference sine wave is integrated over an integer number of complete reference cycles. Ensley et al. discloses that this integrated signal is directly proportional to the product of the sine of the input angular rate and in inertial space and the first order Bessel function that describes the optical phase modulation. The integrated signal is applied to a sample and hold circuit in which the sampling period corresponds to the integration period. The output of the sample and hold circuit is applied to a balanced driver circuit to provide a rate output signal that is directly proportional to the input angular rate.

U.S. Pat. No. 4,735,506, issued Apr. 5, 1988 to Pavlath describes a fiber optic rotation sensor that includes both a fiber optic frequency shifter and a fiber optic phase modulator for modulating the counterpropagating waves.

Another source of instability in the servo loop is electrical cross talk between the phase modulator drive signal and the photodetector circuits used to convert the Sagnac phase shift into electrical signals.

SUMMARY OF THE INVENTION

The invention provides signal processing apparatus and methods that overcome servo loop instabilities in closed loop fiber optic rotation sensors. A fiber optic rotation sensing system according to the present invention that produces a signal indicative of the phase difference of two counterpropagating waves in a fiber optic sensing coil to measure the rotation rate of the sensing coil comprises means for modulating the counterpropagating waves with a reference signal and means for demodulating the electrical signal indicative of the phase difference of two counterpropagating waves with the reference signal. The present invention further comprises means for forming a feedback circuit to carry a feedback signal from the demodulating means to the modulating means. The feedback circuit preferably includes generator means for driving the modulating means to null the phase difference between the counterpropagating waves, means for adjusting the feedback signal to prevent instability therein, and means for processing signals output from the generator means for determining the rotation rate of the sensing loop.

The means for modulating the counterpropagating waves may comprise a phase modulator connected to the fiber optic sensing coil and means for applying the reference signal to the phase modulator. The phase modulator has an effective bandwidth that is large compared to the reciprocal of the transit time of the counterpropagating waves in the sensing loop.

The means for modulating the counterpropagating waves may comprise a fiber optic frequency shifter connected to the fiber optic sensing coil and means for applying the reference signal to the frequency shifter.

The present invention may further comprise a summing circuit having a first input connected to a reference signal generator to receive the reference signal therefrom and a second input connected to the generator means and an output connected to the phase modulator so that the phase modulator is driven by a signal comprised of the sum of the reference signal and the output of the generator means. The generator means preferably produces a ramp signal output. The means for adjusting the feedback signal to prevent instability therein preferably comprises means for applying a periodic signal having a zero mean value to the input of the generator means. The means for adjusting the feedback signal to prevent instability therein may comprise means for applying a pseudo-random signal having a zero mean value to the input of the generator means.

The method of the invention for processing signals indicative of the phase difference of two counterpropagating waves in a fiber optic sensing coil that is included in a fiber optic rotation sensing system to determine the rotation rate of the sensing coil comprising the steps of modulating the counterpropagating waves with a reference signal, demodulating the electrical signal indicative of the phase difference of two counterpropagating waves with the reference signal, and forming a feedback circuit to carry a feedback signal from the demodulating means to the modulating means. The step of forming the feedback circuit includes the steps of driving the modulating means with generator means to null the phase difference between the counterpropagating waves, adjusting the feedback signal to prevent instability therein, and processing signals output from the generator means for determining the rotation rate of the sensing loop.

The step of modulating the counterpropagating waves includes connecting a phase modulator to the fiber optic sensing coil and applying the reference signal to the phase modulator. The method of the present invention further comprises the steps of connecting a summing circuit having a first input to a reference signal generator to receive the reference signal therefrom and a second input connected to the generator means and an output connected to the phase modulator so that the phase modulator is driven by a signal comprised of the sum of the reference signal and the output of the generator means.

The step of adjusting the feedback signal to prevent instability therein preferably comprises the step of applying a periodic signal having a zero mean value to the input of the generator means. The method may also include the step of applying a pseudo-random signal having a zero mean value to the input of the generator means.

DESCRIPTION OF THE PREFERRED EMBODIMENT

Figures 1, 2, 3:
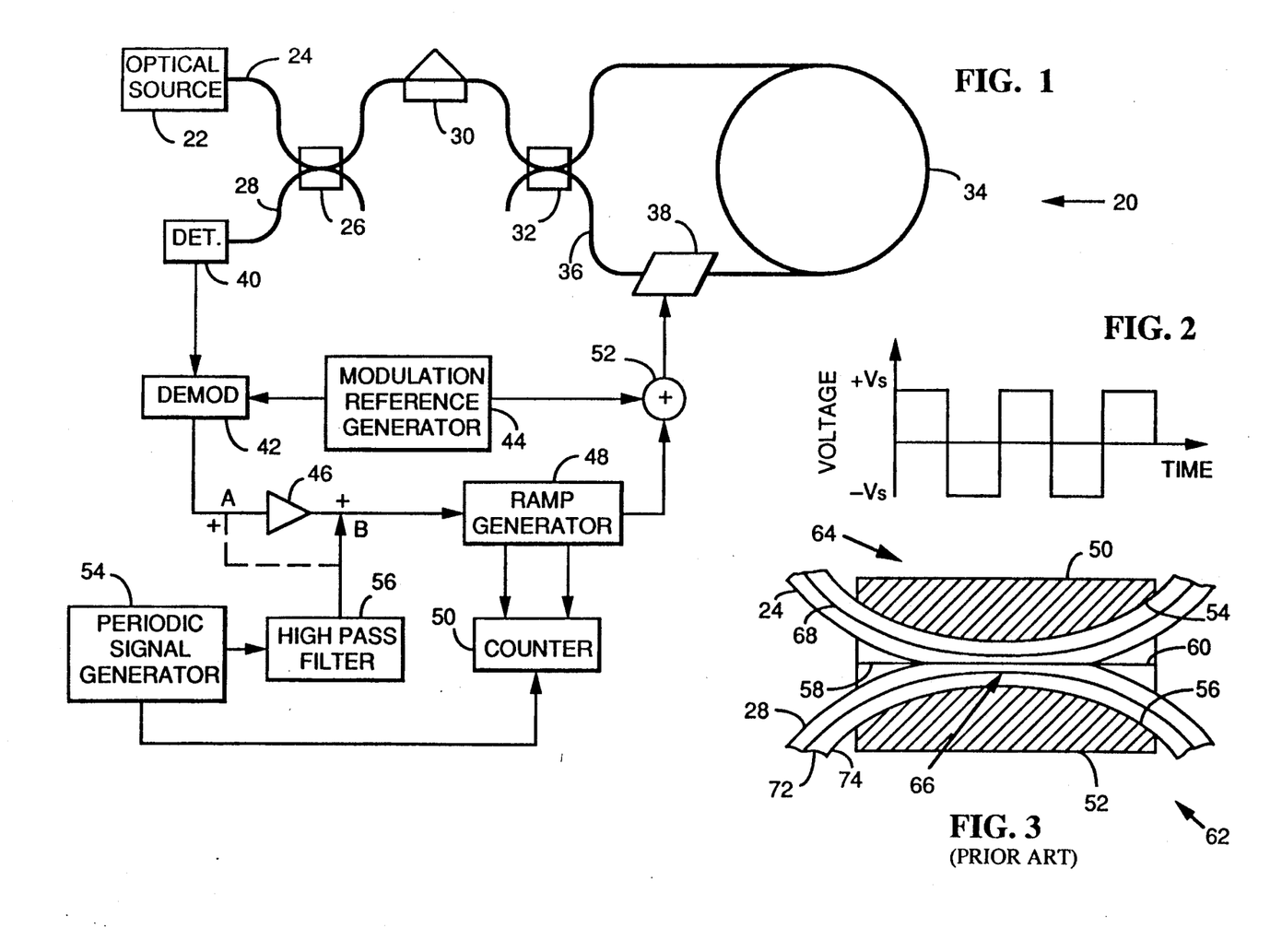
FIG. 1 is a block diagram of a fiber optic rotation sensor that utilizes phase modulation to provide closed loop operation.
FIG. 2 illustrates a square wave modulation voltage that may be applied to the servo loop to prevent instability.
FIG. 3 illustrates a fiber optic coupler that may be included in the fiber optic rotation sensor of FIG. 1.

FIG. 1 illustrates one type of fiber optic rotation sensor 20 that embodies the principles of the present invention. Referring to FIG. 1, the fiber optic rotation sensor 20 includes a source 22 of coherent light that provides a light signal input to an optical fiber 24. The optical fiber 24 preferably is configured to guide a signal mode of electromagnetic energy. Light input to the optical fiber 24 propagates to an optical coupler 26, which is preferably an evanescent field optical coupler described in greater detail subsequently with reference to FIGS. 4 and 5. The optical coupler 26 divides the light incident thereon between the optical fiber 24 and an optical fiber 28.

Light that remain in the optical fiber 24 after passing through the optical coupler 26 then propagates to a polarizer 30. The polarizer 30 is preferably a fiber optic polarizer as described in greater detail with reference to FIGS. 4-6.

After exiting the polarizer 30, the signal input then impinges upon a second fiber optic coupler 32, which may be formed to be substantially identical to the optical coupler 26. The coupler 32 divides in light input thereto from the source 22 between the optical fiber 24 and an optical fiber 36, which is preferably also a single mode optical fiber.

The optical fiber 24 has a Sagnac sensing coil 34 formed therein. A phase modulator 38 is placed between the optical fibers 36 and 24 so that light in the optical fiber 24 propagates through the sensing coil 34 before reaching the phase modulator 38. As viewed in FIG. 1, the light that remains in the optical fiber 24 forms the clockwise wave in the sensing coil 34, and light that the coupler 32 diverts into the optical fiber 36 forms the counterclockwise wave in the sensing coil 34. After passing through the phase modulator 38, the clockwise wave propagates through the optical fiber 36 before reaching the coupler 32. The counterclockwise wave traverses the optical fiber 36, the phase modulator 38, the sensing coil 34 and a portion of the optical fiber 24 before reaching the optical fiber 36 again.

While traversing the sensing coil 34, the clockwise and counterclockwise waves acquire a phase difference that depends upon the rate of rotation of the sensing coil 34 about its sensing axis. The coupler 32 couples part of the clockwise wave from the optical fiber 36 back into the optical fiber 24. The part of the counterclockwise wave remaining in the optical fiber 24 combines with the cross-coupled clockwise wave to form an interference pattern. This interference pattern contains the information that is processed to determine the rotation rate of the sensing coil 34.

The combined waves then propagate back through the optical fiber 24 to the polarizer 30, which insures that the optical signal to be processed to determine the roation rate has the same polarization as the light that was input to the the sensing coil 34. These polarizations should be identical to minimize bias errors and scale factor fluctuations.

The output of the polarizer 30 then reaches the optical coupler 26, which couples part of the signal into the optical fiber 28. The signal then impinges upon a photodetector 40, which converts the optical interference pattern into an electrical signal. The output of the photodetector 40 is fed into a demodulator 42, which demodulates the photodetector signal with a reference signal received from a modulation reference generator 44. The demodulator 42 provides an output signal to an amplifier 46. The reference character A indicates the input of the amplifier 46, and the reference character B indicates the output of the amplifier 46.

The output of the amplifier 46 is input to a ramp generator 48, which produces signals that are sent to a counter 50 for determining the rotation rate. The output of the ramp generator 48 is also input to a summing circuit 52, which sums the ramp voltage from the ramp generator 48 with the signal output from the modulation reference generator 44. The sum signal from the summing circuit 52 is the driving voltage for the phase modulator 38.

The signal processing technique according to the present invention includes introducing a periodic zero mean signal at either the input terminal A or the output terminal B of the amplifier 46. A periodic signal generator 54 having outputs connected to a gate of the counter 50 and to either point A or B provides the periodic signal. The amplitude of the periodic signal is sufficient to cause the voltage in the servo loop to be outside the range in which instability occurs. The amplitude of the periodic signal depends upon whether it is input to the loop before or after the amplifier 46. The fiber optic rotation sensor 20 may include a high pass filter 56 connected between the periodic signal generator 54 and the points A or B of the feedback loop further to ensure a zero mean signal.

The periodic signal generator 54 may also produce a synchronizing signal at the completion of each period of the zero mean periodic signal. The periodic signal may be either deterministic or pseudo-random. The synchronizing signals controls the gate of the counter 50 that counts the pulses output from the fiber optic rotation sensor 20 to assure that the extra pulses caused by the periodic signal generator 54 are exactly averaged out and that only the pulses due to rotation of the fiber optic rotation sensor 20 are effectively counted.

The invention functions satisfactorily if the demodulator 42 is a zero mean square demodulator and the zero mean periodic signal is injected into the servo loop at either point A or B of FIG. 1. Assume that the sensing coil 34 is rotating at a small rotation rate $\Omega$, which ideally would result in $C_r$ net counts per second on the output ports of the ramp generator 48. Assume further that the rotation rate $\Omega$ is small enough that the servo loop signal is oscillating and that the net output counts per second in zero. Referring to FIG. 2, a square wave voltage that varies between $V_s$ and $-V_s$ in a time T is input to the servo loop at point B. The amplitude and period of the square wave need not be fixed quantities, but can be adaptively changed as functions of the rotation rate to optimize the performance of the fiber optic rotation sensor 20 by overcoming servo loop instabilities over a wide dynamic range.

If the voltage $V_s$ is large enough that the servo loop current is well outside the region of instability, then the net number of counts per second $C_r$ during the first half of the square wave (i.e. during the first $T/2$ time period) is $$C_1 = C_{V_s} + C\Omega \tag{1}$$

where $C_{V_s}$ is the count rate to the voltage $V_s$. For the second half of the square wave, the net counts per second $C_2$ is $$C_2 = C_{-V_s} + C\Omega \tag{2}$$

where $C_{-V_s}$ is the count rate due to the voltage $-V_s$. It is known to those skilled in the art of fiber optic rotation sensors and servo control therory that $$-C_{V_s} = C_{-V_s}. \tag{3}$$

Using Equation (3) in Equation (2) results in $$C_2 = -C_{V_s} + C\Omega. \tag{4}$$

The net counts pers second C over the period of the square wave is the average of C1 and C2 give above the Equations (1) and (4) and is $$C = \frac{C_1 + C_2}{2} \tag{5}$$

$$= \frac{(C_{V_s} + C_\Omega) + (-C_{V_s} + C_\Omega)}{2} \tag{6}$$

$$= \frac{2C_\Omega}{2} \tag{7}$$

$$= C_\Omega. \tag{8}$$

Therefore, the output of the fiber optic rotation sensor 20 correctly indicates the rotation rate of the sensing coil 34 even in the presence of servo loop instabilities.

A fiber optic directional coupler suitable for use in single mode fiber implementations of the invention is described in the Mar. 28, 1980 issue of *Electronics Letters*, Vol. 18, No. 18. pp. 260-261 and in U.S. PAT. No. 4,493,518 issued Jan. 15, 1985 to Shaw et al. That patent is assigned to the Board of Trustees of the Leland Stanford Junior University.

Both of the optical couplers 26 and 32 may be of substantially identical structure; therefore, the following description of the optical coupler 26 is applicable to all optical couplers included in the dual fiber optic gyroscope system 20 when the optical fibers 24, 28, and 34 are single mode fibers.

For multimode fiber implementations of the optic rotation sensor 20, suitable multimode couplers (not shown) are well-known in the art. A type of multimode coupler suitable for foming the sensor in multimode applications described in U.S. patent application Ser. No. 816,881 by John J. Fling. That application issued as U.S. Pat. No. 4,738,571 on Apr. 19, 1988. That patent is assigned to Litton Systems, Inc., owner of the present invention.

The boundary between the core and cladding of an optical fiber is a dielectric interface at which certain well-known boundary conditions on the field components must be satisfied. For example, the component of the electric field parallel to the interface must be continuous. A single mode optical fiber propagates electromagnetic energy having an electric field component perpendicular to the core-cladding interface. Since the fiber core has an refractive index greater than that of the cladding and light impinges upon the interface at angles less than or equal to the critical angle, essentially all of the electric field remains in the core by internal reflection at the interface. To satisfy both the continuity and internal reflection requirements, the radial electric field component in the cladding must be a rapidly decaying exponential function. An exponentially decaying electric field is usually called the evanescent field.

As illustrated in FIG. 3, the coupler 26 includes the optical fibers 24 and 28 of FIG. 1 mounted in a pair of substrates 50 and 52, respectively. The fiber 24 is mounted in a curved groove 54 formed in an optically flat surface 58 of the substrate 50. Similarly, the fiber 28 is mounted in a curved groove 56 formed in an optically flat surface 60 of the substrate 52. The substrate 50 and fiber 24 mounted therein comprise a coupler half 62, and the substrate 52 and fiber 28 mounted therein comprise a coupler half 64.

The depths of the grooves 54 and 56 vary from a minimum at the center of the substrates 50 and 52, respectively, to a maximum at the edges of the substrates 50 and 52. The variation in groove depth permits the optical fibers 24 and 28, when mounted in the grooves 54 and 56, respectively, to gradually converge toward the centers and diverge toward the edges of the substrates 50 and 52, respectively. The grooves 54 and 56 may be rectangular in cross section; however, other cross sectional configurations such as U-shaped or V-shaped may be used in forming the coupler 26.

Referring to FIG. 3, at the centers of the substrates 50 and 52, the depths of the grooves 54 and 56 are less than the diameters of the fibers 24 and 28. Fiber optic material is removed from each of the fibers 24 and 28 by any suitable method, such as lapping, to form planar surfaces 61 and 63 in the fibers 24 and 28, respectively, that are coplanar with the confronting surfaces 58 and 60 of the substrates 50 and 52. The oval surfaces are juxtaposed in facing relationship to form an interaction region 66 where the evanescent field of light propagated by each of the fibers 24 and 28 interacts with the other fiber.

Light is transferred between the fibers 24 and 28 by evanescent field coupling at the interaction region 66. The optical fiber 24 comprises a central core 68 and a surrounding cladding 70. The fiber 28 has a core 72 and a cladding 74 that are substantially identical to the core 68 and cladding 70, respectively. The core 68 has a refractive index that is greater than that of the cladding 70, and the diameter of the core 68 is such that light propagating within the core 68 internally reflects at the core-cladding interface. Most of the optical energy guided by the optical fiber 24 is confined to its core 68. However, solution of the wave equations for the fiber 68 and applying the well-known boundary conditions shows that the energy distribution, although primarily in the core 68, includes a portion that extends into the cladding and decays exponentially as the radius from the center of the fiber increases. The exponentially decaying portion of the energy distribution within the fiber 68 is generally called the evanescent field. If the evanescent field of the optical energy initially propagated by the fiber 24 extends a sufficient distance into the fiber 28, energy will couple from the fiber 24 into the fiber 28.

The evanescent field extends a short distance into the cladding and decreases rapidly in magnitude with distance outside the fiber core. Thus, sufficient fiber optic material should be removed to permit overlaph between the evanescent field of waves propagated by the two fibers 24 and 28. If too little material is removed, the cores will not be sufficiently close to permit the evanescent fields to cause the desired interaction of the guided waves; and therefore, insufficient coupling will result.

Figure 4:
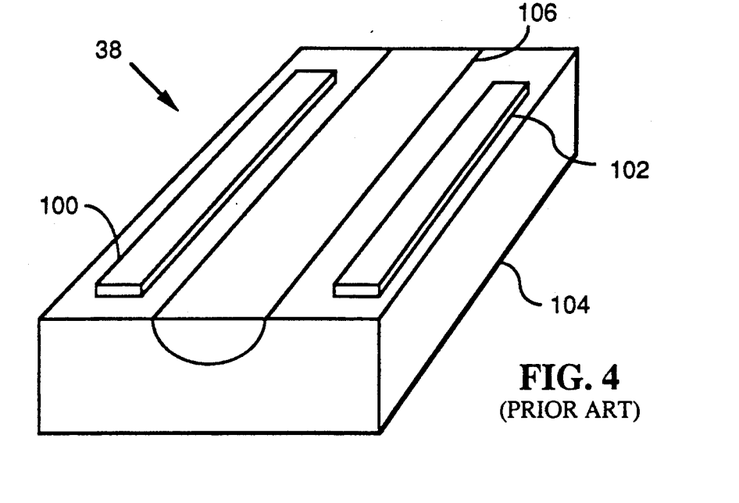
FIGS. 4-6 illustrate an integrated optics phase modulator that may be included in the fiber optic rotation sensor of FIG. 1.
Figure 5:
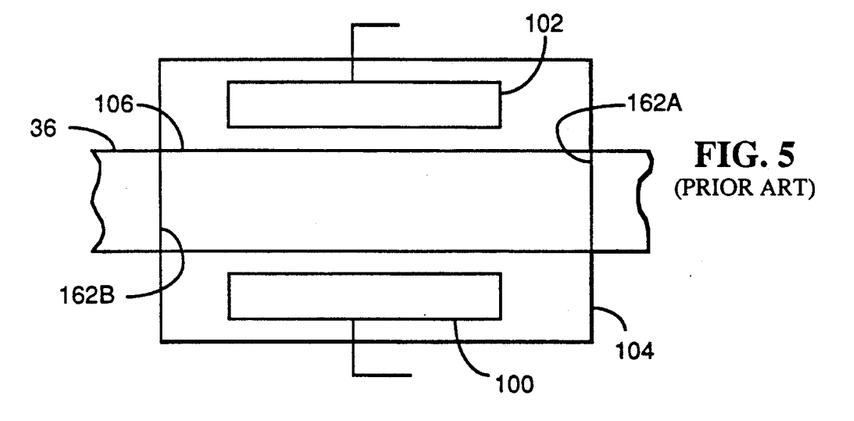
Figure 6:
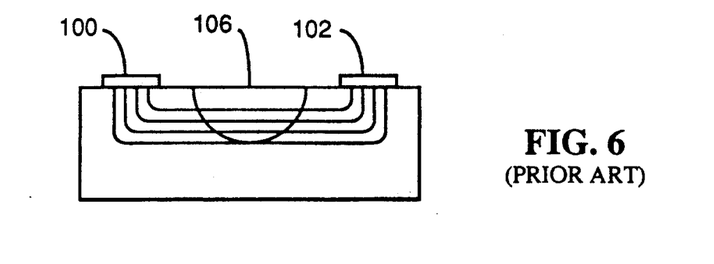

Referring to FIGS. 4-6, the phase modulator 38 includes a pair of electrodes 100 and 102 formed on a lithium niobate substrate 104. An optical waveguide 106 is formed in the substrate 104 by depositing a strip of titanium (not shown) thereon and then heating the titanium to drive it into the substrate. The electrodes 100 and 102 may be on opposite sides of the waveguide 106 as shown in FIGS. 4-7, or one of the electrodes may be formed directly on the waveguide 106 with the other electrode being laterally displaced therefrom.

As shown in FIG. 6, the electric field is primarily horizontal in the waveguide 106. The waveguide 106 has a refractive index $n = n_0 + n_1(E)$, where $n_0$ is a constant component of the refractive index and $n_1(E)$ is a function of the applied electric field E. Since the electric field in the waveguide 106 is essentially in the horizontal direction as viewed in FIG. 6, only the horizontal component of the field affects the refractive index. Changes in the refractive of the waveguide 106 cause its effective optical length to change. Therefore, controlling the electric field provides means for controlling the time required for a light wave to travel through the waveguide 106. This charge in transit time may be viewed as a change in phase of the wave. Since the phase modulator 38 modulates the phase of signals polarized along the crystal principle axis asymmetrically in the waveguide 106, only waves polarized along one principle axis of the waveguide 106 are allowed to enter the phase modulator 38.

In describing the waves that will propagate in an optical fiber, it is convenient to refer to the direction of the electric and magnetic fields relative to the direction of propagation of the wave. The direction of the electric field vector in an electromagnetic wave is the polarization of the wave. In many fiber optic rotation sensing systems it is desirable to have light of a known polarization state at selected points because the output of some components is polarization dependent. Therefore, having a known polarization input to such components minimizes errors. In a polarized optical fiber rotation sensing system, drift errors due to changes in polarization are determined by the quality of the polarizer.

The polarizer 30 shown in FIG. 1 may be essentially identical to the polarizer disclosed in U.S. Pat. No. 4,386,822 to Bergh, the disclosure of which is incorporated by reference into the present disclosure. Other polarizer that may be used in present invention are disclosed in U.S. Pat. No. 4,725,113 and U.S. patent application Ser. No. 767,553, the disclosures of which are incorporated by reference into the present disclosure.

U.S. Pat. No. 4,729,622 issued Mar. 8, 1988 to Pavlath and assigned Litton System, Inc. owner of the present invention discloses a fiber optic polarizer with error signal feedback into a polarization controller that may be used in present invention. This system is briefly described below. The disclosure of U.S. Pat. No. 4,729,622 is incorporated by reference into the present disclosure.

Figure 7:
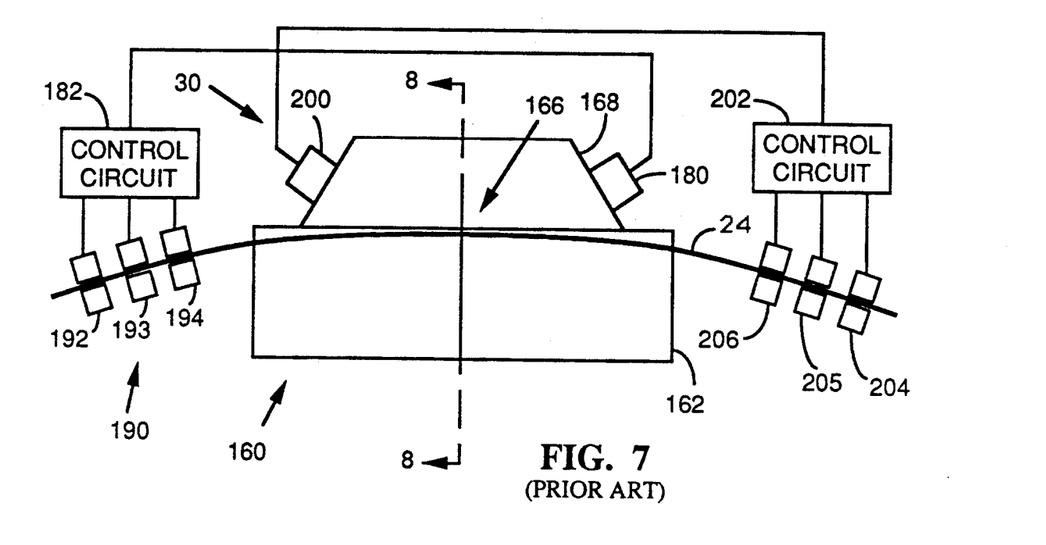
FIG. 7 illustrates one type of fiber optic polarizer that may be included in the fiber optic rotation sensor of FIG. 1.

Referring to FIG. 7 the polaiizer 30 may include a half coupler 160 that comprises a substrate 162, preferably formed of a quartz block, having a curved groove 164 therein. A length of the optical fiber 24 is secured in the groove 164. A portion of the substrate 162 and the optical fiber are ground and polished to form coplanar surfaces 165 and 170 on the substrate 162 and optical fiber 24, respectively. The grinding and polishing operation removes a portion of the cladding from the optical fiber 24 to form an interaction region 166. A birefringent crystal 168 having an optically flat surface 167 thereon is mounted to the surface 170 of the substrate 160. In the interaction region 166 the evanescent field of light propagating in the fiber 24 interacts with the birefringent crystal 168.

If the fiber 24 is a single mode fiber, then the only modes propagated are those in which the directions of the electric and magnetic fields are approximately perpendicular to the direction of propagation of the wave through the fiber 24. One polarization vector is perpendicular to the surface 165 and the other polarization vector lies in the plane of the surface 165.

The crystal 168 is arranged so that for light polarized perpendicular to the crystal-fiber interface, the refractive index of the crystal 168 is less than the refractive index of the fiber 168. Therefore, light propagating within the optical fiber 24 with a polarization perpendicular to the crystal-fiber interface remains in the optical fiber 24 because of total internal reflection at the crystal-fiber interface. The index of refraction of the crystal 168 for polarizations parallel to the crystal-fiber interfaces is chosen to be greater than the index of refraction of the optical fiber 24 so that light polarized parallel to the crystal-fiber interface couples out of the optical fiber 24 into the birefringent crystal 168.

Referring to FIG. 7, if light is incident from the left, the radiated energy of the parallel polarization component of the wave travels through the crystal 168. A portion of the radiated energy impinges upon a photodetector 180 that outputs an electric current in response to the optical intensity incident thereon. An electronic control circuit 182 processes the photodetector output and provides control signals to a fiber optic polarization controller system 190, which adjusts the polarization input to the polarizer 30 to minimize the control signal. The optical throughout of polarizer 30, therefore, has essentially a single predetermined polarization at a constant intensity.

Polarization control system 54 preferably includes a plurality of fiber squeezers 192-194 connected to the control circuit 182. Fiber squeezers 192-194 are preferably identical in structure. Suitable fiber squeezers are disclosed in U.S. Pat. No. 4,753,507, the disclosure of which is incorporated by reference into this disclosure. Each of the fiber squeezers 192-194 may comprise a piezoelectric actuator (not shown) that responds to voltages from control circuit 182 to change to compressive force on fiber 244 from a preload. The fiber squeezer 192 and 194 preferably are aligned so that the stresses produced thereby are aligned to be parallel to each other and perpendicular to fiber 24. Fiber squeezer 193 is disposed between fiber squeezer 192 and 194. Fiber squeezer 193 applies as stress that is perpendicular to fiber 24 and that is also at an angle of 45 degrees to the stresses produced by the fiber squeezer 192 and 194.

Optical fiber 24 is a birefringent medium, which means that the index of refraction is polarization dependent. The amount of birefringence is used herein to mean the difference between the two refractive indices of a medium that guides a light wave. Controlling the amount of birefringence permits the control of the polarization of a light signal output from a length of fiber optical material. Application of a compressive force to a length of optical fiber 24 along an axis transverse thereto changes the refractive indices by means of the photoelastic effect, resulting in stress-induced birefringence.

In general, three fiber squeezers are required to convert an arbitrary polarization into a predetermined polarization. If there is no appreciable birefringence in the length of fiber 24 between adjacent fiber squeezers 192-194, then only two fiber squeezers are required to control the polarization of the light input to polarizer 30.

Polarizer 30 is capable of providing an output having a predetermined polarization in counterpropagating waves in fiber 24. If light of mixed polarization impinges upon polarizer 30 from the right, then the undesired polarization is rediated from fiber 24 while the desired polarization remains therein. A second photodetector 200 produces an electrical signal indicative of the intensity of the radiated polarization. A second control circuit 202 processes the output of photodetector 200 and provides control signals to a plurality of fiber squeezer 204-206, which are essentially identical to fiber squeezer 192-194 described above. The polarizer 30 generates error signals from two counterpropagating waves at the same region of fiber 24 so that all optical signals emanating from polarizer 30 have the same polarization and the same intensity.

Figure 8:
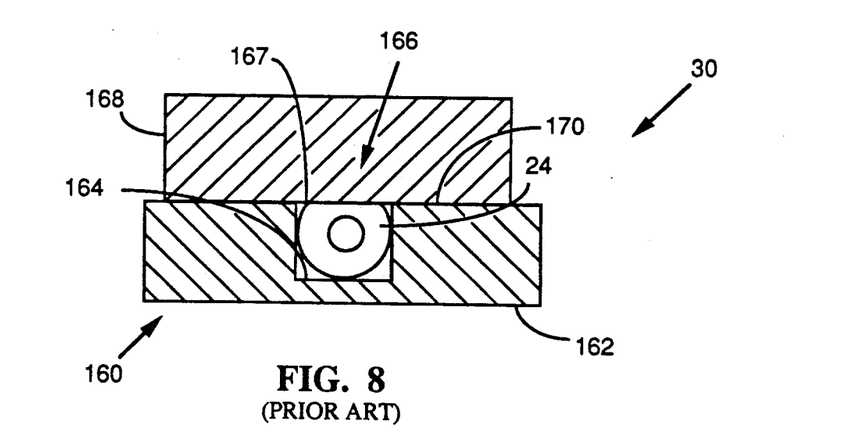
FIG. 8 illustrates a second type of fiber optic polarizer that may be included in the fiber optic rotation sensor of FIG. 1.

FIG. 8 shows another type of polarizer that may be used in present invention includes a dielectric buffer layer 210 placed adjacent the coupler half 160 instead of the crystal 168. A thin metallic layer 212 is placed over the buffer layer 210. The undesired polarization couples out of the fiber into the metal layer 212.

Instead of the phase modulator 38, an optical frequency shifter may be included in the fiber optic rotation sensor 20 for modulating the counterpropagating waves. U.S. Pat. No. 4,729,620, the disclosure of which is incorporated by reference into the present disclosure, disclosure a fiber optic frequency shifter that may be used in the present invention. The acoustooptic frequency shifter device disclosed by Risk et al. "Single-sideband frequency shifting in birefringent optical fiber", SPIE, Vol. 478 Fiber Optic and Laser Sensors II, 1984, pages 91–97, the disclosure of which is also incorporated by reference into the present disclosure, may also be used in the present invention. Optical frequency shifting using a Bragg cell may also be used to modulate the counterpropagating waves.

Figure 13:
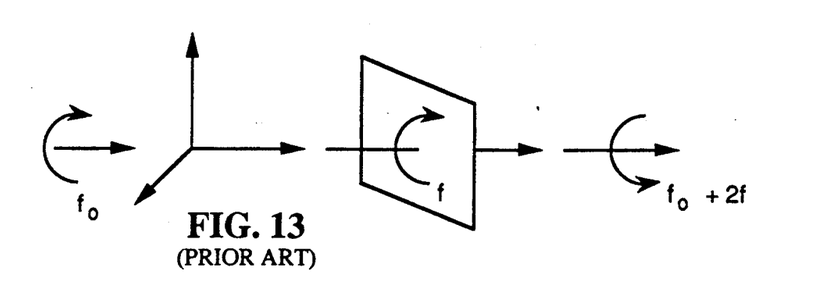
FIGS. 13 and 14 illustrate the effect of a frequency shifter on an optical wave.

FIG. 13 represents circularly polarized input light incident upon a half wave plate 260 that rotates at an angular frequency f. The input light has an angular frequency $f_0$. The input wave travels in the positive z-direction and has equal magnitude polarization vectors along the x- and y-axes. The polarization vectors are 90° out of phase. Therefore, the polarization vector appears to rotate at an angular velocity $f_0$ about the z-axis in a clockwise direction when viewed looking toward the direction of propagation. The half wave plate 260 rotates in the same direction as the polarization vector so that the output wave is shifted from the input frequency $f_0$ to have a frequency of $f_0+2f$.

Figure 14:
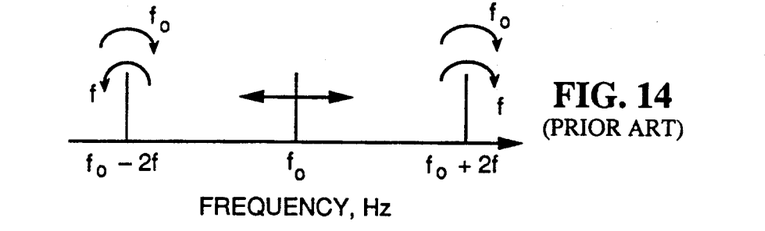

FIG. 14 graphically represents the possible frequency outputs from the frequency shifter. If the input frequency is $f_0$, then rotating the half-wave plate at a frequency f in the direction of the input beam produces an output of $f_0+2f$. Rotating the half-wave plate 260 at the frequency f in a direction opposite to the polarization of the input wave produces an output wave having a frequency of $f_0-2f$. Controlling the rotational frequency f permits the output frequency of the quarter wave plate to have a range of $f_0 \pm 2f_{max}$, where $f_{max}$ is the maximum rotational frequency of the half wave plate 260.

Figures 9, 12:
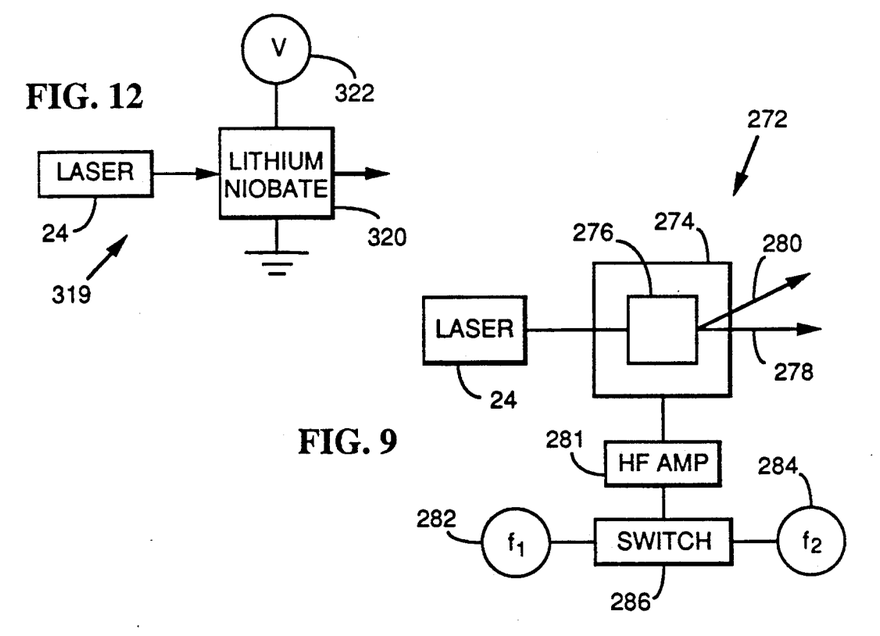
FIG. 9 illustrates a Bragg cell that may be used to shift the frequency of light in the present invention.
FIG. 12 illustrates apparatus for implementing the serrodyne frequency shifting technique.
Figure 10:
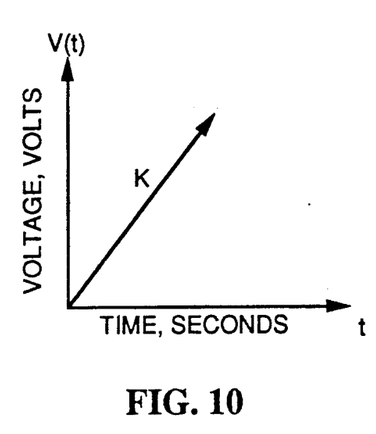
FIGS. 10 and 11 illustrate a serrodyne frequency shifting technique that may be included in the apparatus of the present invention.
Figure 11:
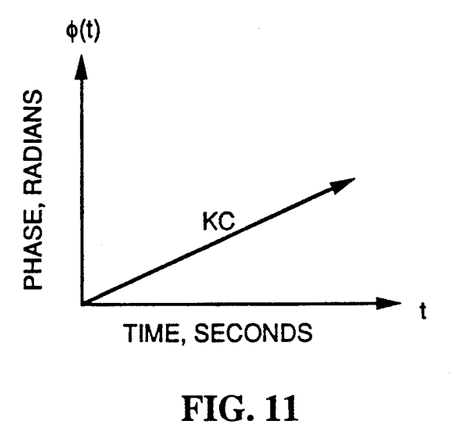
Figure 15:
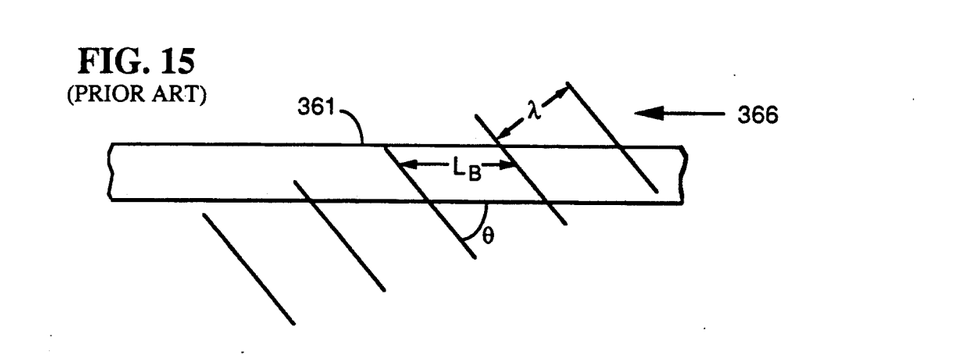
FIGS. 15 and 16 illustrate a second frequency shifter structure that may be used in the present invention.
Figure 16:
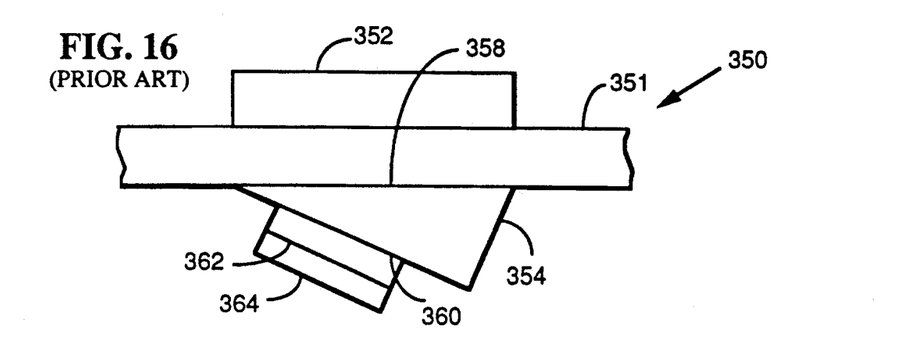

Referring to FIG. 9, a frequency shifter 270 may be formed to include a Bragg cell 272. A suitable frequency shifting technique may also include a serrodyne frequency shifter as shown in FIGS. 10–12 or an acoustooptical frequency shifter as shown in FIGS. 15–16.

Referring to FIG. 9, the Bragg cell 272, comprises a glass slab 274 driven by an acoustic transducer 276, which launches acoustic waves into the glass slabe 274. Applying modulating signals of frequency $\omega_m$ to the acoustic transducer 276 controls the frequency of the acoustic waves in the glass slab 126. the acoustic wavefronts in the glass slab 274 function as a moving diffraction grating, which transmits a first portion 278 of the incident optical beam and reflects a second portion 280. If the optical signal has frequency $\omega_0$, then the portion 280 of the beam reflected from the Bragg cell 272 has frequency $\omega_0+\omega_m$; and the transmitted portion of the beam has the original frequency $\omega_0$. In a typical Bragg cell, approximately 60% to 70% of the incident optical energy is reflected and shifted in frequency.

The Bragg cell accomplishes optical frequency shifting by passing an optical signal through an electro-optic crystal having a three-fold axis and applying a rotating electric field to the crystal. To be frequency shifted, the optical beam is preferably circularly polarized and directed along the three-fold axis of the crystal. With no field applied, the crystal exhibits no birefringence, and the emergent beams is unaffected. When the applied field has the proper half-wave amplitude and rotates in a plane normal to the three-fold axis, the crystal functions as a rotating half-wave plate. The emergent beam has its optical frequency shifted and its sense of polarity reversed. The frequency shift is equal to twice the rotation rate of the applied field. Because a uniformly rotating applied field ideally results in a single new frequency in output beam, rotating field frequency shifters are often referred to as single-side-band-suppressed-carrier (SSBSC) modulators.

As shown in FIG. 9, the Bragg cell 272 receives an input signal from an amplifier 281, which amplifies the modulating signal. The output of the amplifier 281 is under the control of a pair of oscillators 282 and 284 that produce electrical signals of frequency $\omega_1$ and $\omega_2$. The signals output from the oscillators 282 and 284 are fed into a switch 286, which selectively inputs one of the signals of frequency $\omega_1$ or $\omega_2$ to the amplifier 281.

Referring to FIGS. 10 and 11, the serrodyne technique of frequency shifting incorporates a linear optical phase shifter driven with a ramp signal. This ramp signal produces a linearly time varying phase shift, which is in essence, a frequency shift for the duration of the ramp. The optical frequency produced is determined by the time rate of change of the ramp and the scale factor of the phase shifter. FIG. 10 graphically illustrates a ramp voltage that increases linearly with time at a rate of K v/s.

FIG. 11 graphically illustrates the phase of an optical signal output from a modulator driven by the ramp voltage of FIG. 10. The time rate of change of the phase is the frequency shift. Referring to FIG. 11, therefore, the frequency shift is $d\theta(t)/dt=KC$, where C is the modulator scale factor. An examplary methods for implementing the serrodyne frequency shifting technique is described below with ference to FIG. 12.

An examplary type of serrodyne frequency shifting system 319 is shown in FIG. 12. Optical signals from the laser 22 of FIG. 1 are input to an electrooptically active material 320, which may be lithium niobate. Applying a voltage from a voltage source 322 to the electrooptically active material 320 changes the phase of optical signals propagating therein. The amount of phase change may be controlled by controlling the voltage V from the voltage source 322 that is applied to the electrooptically active material 320.

Another type of frequency shifter 350 that may be used in the present invention is shown in FIGS. 15 and 16. The frequency shifter 350 includes a length of optical fiber 351 retained between a block 352 formed of a material such as aluminum and a block 351 formed of a material such as fused quartz. The optical fiber 351 is preferably formed to progated a single mode of electromagnetic energy in the optical frequency range. The quartz block 354 preferably is formed to have a wedge-shaped configuration so that a first surface 358 of the block contacts the optical fiber 351. A second surface 360 of the block 358 is oriented at an angle to the longitudinal axis of the fiber 351. The aluminum block 352 may be of any desired shape and is shown to have a rectangular cross section only for convenience of illustration. A metallic layer 362 comprising Cr-Ar, for example, is formed on the surface, and a transducer 364, formed of PZT, for example, is mounted to the metallic layer. The PZT transducer may have a metallic layer of Cr-Au formed on a surface which faces away from the surface of the quartz block. The transducer may be driven by a suitable oscillator to launch an acoustic wave in the fiber.

The fiber, being a single mode fiber, supports two orthogonal polarizations of the single propagation mode. There are two polarizations because the fiber is birefringent, having different refractive indices for different directions of the electric field in the fiber. The two polarizations are normally uncoupled so that there is no energy transfer from one polarization to the other. A spatially periodic stress pattern imposed on the fiber induces coupling between the two polarizations, leading to power transfer therebetween. The power transfer is cumulative only if the spatial period of the stress pattern equals the beat length of the fiber. The beat length of the optical fiber is $L_B = \lambda/\Delta n$, where $\Delta n$ is the difference in the refractive indices for the two polarizations and $\lambda$ is the optical wavelength. A stress pattern is most effective in causing coupling of the two polarization when the stress is directed at 45 degrees to the principal axes of birefringence.

The transducer forms a moving stress pattern in the fiber by means of the travelling acoustic wave. If the stress pattern moves along the fiber, light coupled from one polarization to the other is shifted in frequency by an amount equal to the frequency of the moving stress pattern because of the motion of the coupling region. For convenience of reference, one of the polarizations will be referred to as "slow;" and the other polarization will be referred to as "fast." The velocity of a light wave in a dielectric medium is the free space velocity of light divided by the refractive index of dielectric; or $v = c/n$. Therefore, it may be seen that in a birefringent medium the polarization for which the refractive index is the greater is the slow wave; and the polarization for which the refractive index is smaller is the fast wave.

Referring to FIG. 15, the lines 366 represent a plane acoustic wavefront of wavelength $\lambda_a$ incident upon the fiber. Phase matching occurs when the component of the beat length $L_B$ in the direction of propagation of the acoustic wave equals the acoustic wavelength $\lambda$. Therefore, from FIG. 17 it is seen that $L_B \sin \theta = \lambda_a$. Using a well-known relation between wave velocity, frequency and wavelength to eliminate the acoustic wavelength from the preceding equation gives the acoustic frequency as $$f = \frac{v}{L_B \sin \theta},$$

where v is the acoustic wave velocity in the fiber.

What is claimed is:

1. A fiber optic rotation sensing system that produces a signal indicative of the phase difference of two counterpropagating waves in a fiber optic sensing coil to measure the rotation rate of the sensing coil, comprising:
   means for modulating the counterpropagating waves with a reference signal;
   means for demodulating the signal indicative of the phase difference of two counterpropagating waves with the reference signal;
   means for forming a feedback circuit to carry a feedback signal from the demodulating means to the modulating means, the feedback signal having a region of instability, the feedback circuit including:
   generator means for driving the modulating means to null the phase difference between the counterpropagating waves;
   means for adjusting the feedback signal with a periodic signal having a zero mean value to maintain a current in the feedback circuit outside the region of instability; and
   means for processing signals output from the generator means for determining the rotation rate of the sensing loop.

2. The system of claim 1 wherein the means for modulating the counterpropagating waves includes a phase modulator connected to the fiber optic sensing coil and means for applying the reference signal to the phase modulator.

3. The system of claim 2, further comprising a summing circuit having a first input connected to a reference signal generator to receive the reference signal therefrom and a second input connected to the generator means and an output connected to the phase modulator so that the phase modulator is driven by a signal comprised of the sum of the reference signal and the output of the generator means.

4. The system of claim 3 wherein the generator means produces a ramp signal output.

5. The system of claim 4 wherein the ramp signal is an analog signal.

6. The system of claim 4 wherein the ramp signal is a digital signal.

7. The system of claim 4 wherein the means for adjusting the feedback signal to maintain a current in the feedback circuit outside the region of instability comprises means for applying a pseudo-random signal having a zero mean value to the input of the generator means.

8. The system of claim 2 wherein the phase modulator has an effective bandwidth that is large compared to the reciprocal of the transit time of the counterpropagating waves in the sensing loop.

9. The system of claim 1 wherein the means for modulating the counterpropagating waves with a reference signal has an effective bandwidth that is large compared to the reciprocal of the transit time of the counterpropagating waves in the sensing loop.

10. The system of claim 1 wherein the generator means produces a ramp signal output.

11. The system of claim 10 wherein the means for adjusting the feedback signal comprises means for applying a pseudo-random signal having a zero mean value to the input of the generator means.

12. A method for processing signals indicative of the phase difference of two conterpropagating waves in a fiber optic sensing coil that is included in a fiber optic rotation sensing system to determine the rotation rate of the sensing coil, comprising the steps of:
   modulating the counterpropagating waves with a reference signal;
   demodulating the signal indicative of the phase difference of two counterpropagating waves with the reference signal;
   forming a feedback circuit to carry a feedback signal, the feedback signal having a region of instability, from the demodulating means to the modulating means by the steps of:
   driving the modulating means with generator means to null the phase difference between the counterpropagating waves;
   adjusting the feedback signal with a periodic signal having a zero mean value to maintain a current in the feedback circuit outside the region of instability; and
   processing signals output from the generator means for determining the rotation rate of the sensing loop.

13. The method of claim 12 wherein the step of modulating the counterpropagating waves includes the steps of connecting a phase modulator to the fiber optic sensing coil and applying the reference signal to the phase modulator.

14. The method of claim 13, further comprising the steps of:

connecting a first input of a summing circuit to a reference signal generator to receive the reference signal therefrom;

connecting a second input of the summing circuit to the generator means; and connecting an output of the summing circuit to the phase modulator so that the phase modulator is driven by a signal comprised of the sum of the reference signal and the output of the generator means.

15. The method of claim 14 including the step of forming the generator means to produce a ramp signal output.

16. The method of claim 15 wherein the step of adjusting the feedback signal comprises step of applying a pseudo-random signal having a zero mean value to the input of the generator means to maintain a current in the feedback circuit outside the region of instability.

17. The method of claim 13 including the step of forming the phase modulator to have an effective bandwidth that is large compared to the reciprocal of the transit time of the counterpropagating waves in the sensing loop.

18. The method of claim 12 including the step of modulating the counterpropagating waves with a reference signal has an effective bandwidth that is large compared to the reciprocal of the transit time of the counterpropagating waves in the sensing loop.

19. The method of claim 12 including the step of forming the generator means to produce a ramp signal output.

20. The method of claim 19 including the step of forming the ramp signal to be an analog signal.

21. The method of claim 19 including the step of forming the ramp signal to be a digital signal.

22. A fiber optic rotation sensing system that produces a signal indicative of the phase difference of two counterpropagating waves in a fiber optic sensing coil to measure the rotation rate of the sensing coil, comprising:

a modulation reference signal source for supplying a modulation reference signal;

a phase modulator connected to the fiber optic sensing coil for modulating the counterpropagating waves with the modulation reference signal;

means for demodulating the signal indicative of the phase difference of two counterpropagating waves with the modulation reference signal;

means for forming a feedback circuit to carry a feedback signal from the demodulating means to the phase modulator, the feedback signal having a region of instability, the feedback circuit including:

a ramp signal generator for driving the phase modulator to null the phase difference between the counterpropagating waves;

a summing circuit having a first input connected to the reference signal source to receive the reference signal therefrom and a second input connected to the ramp signal generator and an output connected to the phase modulator to drive the phase modulator with a signal comprised of the sum of the reference signal and the output of the ramp signal generator;

means for applying a periodic signal having a zero mean value to the input of the ramp signal generator to adjust the feedback signal to maintain a current in the feedback circuit outside the region of instability; and means for processing signals output from the ramp signal generator for determining the rotation rate of the sensing loop.

23. A fiber optic rotation sensing system that produces a signal indicative of the phase difference of two counterpropagating waves in a fiber optic sensing coil to measure the rotation rate of the sensing coil, comprising:

means for modulating the counterpropagating waves with a reference signal;

means for demodulating the electrical signal indicative of the phase difference of two counterpropagating waves with the reference signal;

means for forming a feedback circuit to carry a feedback signal from the demodulating means to the modulating means, the feedback signal having a region of instability, the feedback circuit including:

a ramp signal generator for supplying a ramp signal to drive the modulating means to null the phase difference between the counterpropagating waves;

means for adjusting the feedback signal by applying a periodic signal having a zero means value to the input of the ramp signal generator means to maintain a current in the feedback circuit outside the region of instability; and means for processing signals output from the ramp signal generator means for determining the rotation rate of the sensing loop.

24. A method for processing signals indicative of the phase difference of two counterpropagating waves in a fiber optic sensing coil that is included in a fiber optic rotation sensing system to determine the rotation rate of the sensing coil, comprising the steps of:

connecting a phase modulator to the fiber optic sensing coil;

applying a reference signal to the phase modulator;

modulating the counterpropagating waves with the reference signal;

demodulating the signal indicative of the phase difference of two counterpropagating waves with the reference signal;

forming a feedback circuit to carry a feedback signal, the feedback signal having a region of instability, from the demodulating means to the modulating means by the steps of:

forming generator means to produce a ramp signal output;

driving the modulating means with generator means to null the phase difference between the counterpropagating waves;

connecting a first input of a summing circuit to a reference signal generator to receive the reference signal therefrom;

connecting a second input of the summing circuit to the generator means; and connecting an output of the summing circuit to the phase modulator so that the phase modulator is driven by a signal comprised of the sum of the reference signal and the output of the generator means;

adjusting the feedback signal by applying a periodic signal having a zero mean value to the input of the generator means to maintain the feedback signal outside the region of instability; and processing signals output from the generator means for determining the rotation rate of the sensing loop.

25. A method for processing signals indicative of the phase difference of two counterpropagating waves in a fiber optic sensing coil that is included in a fiber optic rotation sensing system to determine the rotation rate of the sensing coil, comprising the steps of:

modulating the counterpropagating waves with a reference signal;

demodulating signals indicative of the phase difference of two counterpropagating waves with the reference signal;

forming a feedback circuit to carry a feedback signal, the feedback signal having a region of instability, from the demodulating means to the modulating means by the steps of:

forming generator means to produce a ramp signal output;

driving the modulating means with generator means to null the phase difference between the counterpropagating waves;

servoing the feedback signal outside the region of instability by applying a periodic signal having a zero mean value thereto; and processing signals output from the generator means for determining the rotation rate of the sensing loop.

26. A method for processing signals indicative of the phase difference of two counterpropagating waves in a fiber optic sensing coil that is included in a fiber optic rotation sensing system to determine the rotation rate of the sensing coil, comprising the steps of:

modulating the counterpropagating waves with a reference signal;

demodulating signals indicative of the phase difference of two counterpropagating waves with the reference signal;

forming a feedback circuit to carry a feedback signal, the feedback signal having a region of instability, from the demodulating means to the modulating means by the steps of:

forming generator means to produce a ramp signal output;

driving the modulating means with the generator means to null the phase difference between the counterpropagating waves;

maintaining the feedback signal outside the region of instability by applying a pseudo-random signal having a zero mean value to the generator means; and processing signals output from the generator means for determining the rotation rate of the sensing loop.

* * * * *

UNITED STATES PATENT AND TRADEMARK OFFICE
CERTIFICATE OF CORRECTION

PATENT NO. : 5,020,912
DATED : June 4, 1991
INVENTOR(S) : George A. Pavlath

It is certified that error appears in the above-identified patent and that said Letters Patent is hereby corrected as shown below:

On title page, item [54], lines 1-4, "BASING" should read
--BIASING--; and, the term "LEGION" should read --REGION--.

Col. 1, lines 1-3, "BASING" should read
--BIASING--; and, the term "LEGION" should read --REGION--.

Signed and Sealed this

Third Day of August, 1993

Attest:

MICHAEL K. KIRK

Attesting Officer

Acting Commissioner of Patents and Trademarks